United States Patent [19]

Kaczynski

[11] Patent Number: 4,575,008

[45] Date of Patent: Mar. 11, 1986

[54] FUEL INJECTION NOZZLE FOR INTERNAL COMBUSTION ENGINES

[75] Inventor: Bernhard Kaczynski, Waiblingen, Fed. Rep. of Germany

[73] Assignee: Robert Bosch GmbH, Stuttgart, Fed. Rep. of Germany

[21] Appl. No.: 598,094

[22] Filed: Apr. 9, 1984

[30] Foreign Application Priority Data

Jul. 26, 1983 [DE] Fed. Rep. of Germany ....... 3326840

[51] Int. Cl.[4] ........................ F02M 47/00; B05B 1/30; G01M 15/00

[52] U.S. Cl. ............................ 239/533.3; 239/533.11; 239/585; 73/119 A

[58] Field of Search ................ 251/139, 141; 239/585, 239/533.2-533.12; 73/119 A

[56] References Cited

U.S. PATENT DOCUMENTS

| | | | |
|---|---|---|---|
| 1,587,921 | 6/1921 | Ray | 251/141 |
| 1,754,740 | 4/1930 | Clarkson | 239/585 |
| 1,999,221 | 4/1935 | Walker et al. | 239/585 X |
| 4,187,987 | 2/1980 | Raue | 239/585 |
| 4,387,677 | 6/1983 | Guerrier | 239/585 X |

FOREIGN PATENT DOCUMENTS

| | | | |
|---|---|---|---|
| 380355 | 9/1923 | Fed. Rep. of Germany | 239/533.11 |
| 2093912 | 9/1982 | United Kingdom | 239/533.9 |
| 2099077 | 12/1982 | United Kingdom | 239/533.2 |

*Primary Examiner*—Andres Kashnikow

*Assistant Examiner*—Mary Beth O. Jones

*Attorney, Agent, or Firm*—Edwin E. Greigg

[57] ABSTRACT

The invention relates to a fuel injection nozzle for internal combustion engines, in which a damping piston is located on the end of the valve needle, which valve needle opens in the flow direction, remote from the injection side. The damping piston cooperates with a cap that is mounted on the damping piston and spring-loaded in the direction of opening, and the cap and the damping piston define a damping chamber. A support ring which is stressed in a positively engaged manner by the closing spring of the injection nozzle is disposed on the valve needle. In the spatial segment between the damping chamber and the support ring, an encapsulated induction coil attached to a tubular segment surrounds the valve needle, and the support ring serves as the armature of a transducer embodied by the injection coil and at least one part, serving as the yoke of the encapsulation.

20 Claims, 4 Drawing Figures

FUEL INJECTION NOZZLE FOR INTERNAL COMBUSTION ENGINES

BACKGROUND OF THE INVENTION

The invention is based on a fuel injection nozzle for internal combustion engines.

Because requirements made by engine manufacturers vary, contradictory tasks are often expected of a present-day Diesel fuel injection system, such as quiet operation, which is based on the longest possible injection duration, and good fuel preparation, which is attainable only with a short injection duration. While quiet operation is an object primarily during idling, so as to suppress the "dieseling" effect, better fuel preparation plays a role particularly in the upper rpm range, where the most important consideration is favorable fuel consumption. For this reason, depending on the use to which a given injection system is to be put, compromises are made in designing the components of a fuel injection system, such as the injection pump, the rpm governor and the injection nozzles. The introduction of electronics into Diesel fuel injection has made it easier to effect such compromises. Electronics are used above all in the Diesel governor, for which very precise measurements of the injection onset and duration are critical to the quality of regulation, and a satisfactory measurement can only be accomplished directly in the injection nozzle and via the valve needle. Certain injection functions, such as valve needle damping, are preferably accomplished by hydromechanical means, again in the injection nozzle. Because of the design specifications set by the manufacturers, however, an injection nozzle cannot be of arbitrarily large size; instead, whether with or without an electrical transducer and with or without damping, the injection nozzle should not exceed the dimensions of a conventional mass-produced nozzle, the size of which was taken into account by the engine designer in designing the engine. A further difficulty arises because electronics are used particularly in Diesel engines for passenger cars to make the smoothness of operation more nearly approach that of a vehicle powered by an Otto engine. In these passenger car engines, however, the fuel injection nozzles are relatively small because of the relatively low fuel consumption, and so some of the movable parts they contain are already a matter of precision engineering. Since the available space is already virtually optimally utilized for the basic structure of the passenger car injection nozzle, it is extremely difficult to accommodate additional damping devices or electrical transducers in the injection nozzle.

For reasons of space, the induction coil for the transducer of a known fuel injection nozzle (German Pat. No. 30 24 424.7) was placed in the vicinity of the nozzle holder, and the support ring that is moved with the valve needle was extended far enough beyond the end of the valve needle that it forms a magnetic circuit with the valve carrier and the nozzle holder. An unmagnetized spacer ring associated with the induction coil divides the induction coil from the support ring. In this realization, the external dimensions of the conventional, outwardly opening fuel injection nozzle of comparable capacity and in which no inductive transducer is disposed are not exceeded. In this known fuel injection nozzle, not only are there considerable transducer dissipation losses because of the relatively large volumes experiencing magnetic flux, but there is the further disadvantage that the remaining volume that is available for use is not sufficient to accommodate a damping device.

OBJECT AND SUMMARY OF THE INVENTION

The fuel injection nozzle according to the invention has the disadvantage over the prior art that without varying the outer shape and external dimensions of a mass-produced fuel injection nozzle, both a damping device and an inductive transducer can be accommodated inside the fuel injection nozzle. The induction coil here assumes an optimal position with respect to the valve needle, so that the volumes required to experience magnetic flux can be kept extremely small, and magnetic dissipation losses can be minimized as a result. Additionally, parts that are present in the design in any case are used without alternation, offering the further advantage of low manufacturing costs. Because the design skillfully provides for the advantageous accommodation of the parts with respect to the longitudinal axis of the nozzle, the difficulty of adhering to longitudinal tolerances during manufacture is reduced sharply.

In an advantageous embodiment of the invention, the encapsulation to protect the induction coil from fuel comprises an outer sheath, an inner sheath and two ring segments connecting the sheaths at either side of the coil to one another. The ring segments are sealingly connected to one another, and the ring segment facing the support ring is of unmagnetized material. This basic construction can be realized in quite various ways. In every case, the tube which in the conventional mass-produced nozzle surrounds the valve group made up of the closing spring, valve needle and spring plates and which is fastened between the nozzle holder and the nozzle body by a sleeve nut is utilized at least in parts as the outer sheath.

The support ring, too, on which the closing spring is supported on the side remote from the nozzle body, is a conventional part, which with the valve needle is axially movable with a certain amount of play inside the tube or the outer sheath. In accordance with the invention, this support ring is the armature of the transducer, the induction coil of which may be encapsulated in various ways, and if the air gap thereof is varied, a variation in flux results.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
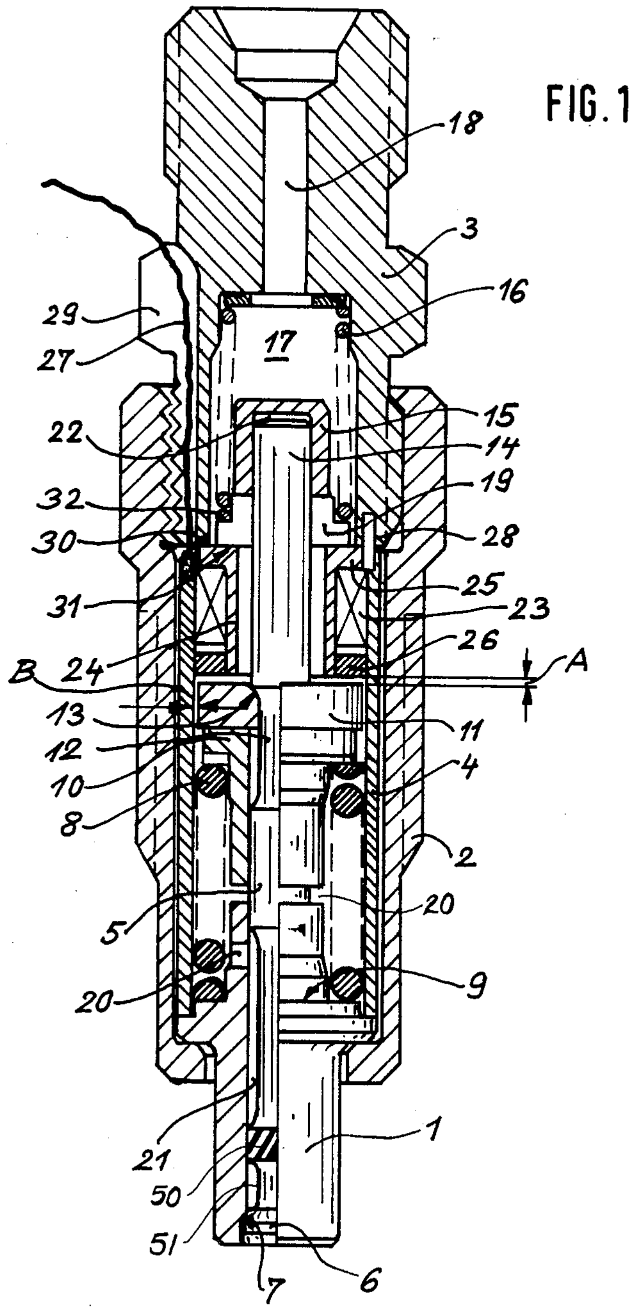
FIG. 1 is a view of a fuel injection nozzle according to the invention, seen in longitudinal section.
Figure 2:
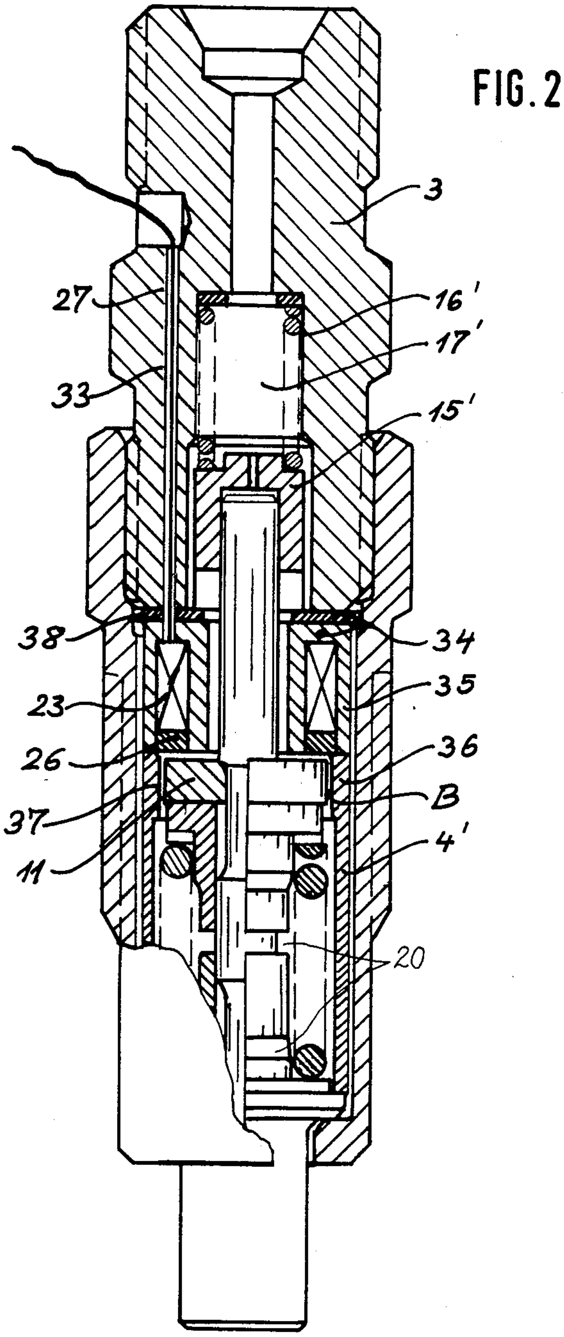
FIGS. 2, 3 and 4 are longitudinal sections taken through variants of this exemplary embodiment.
Figure 3:
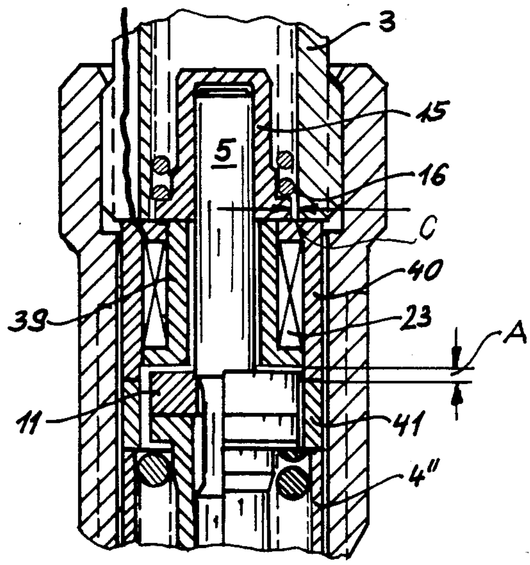
Figure 4:
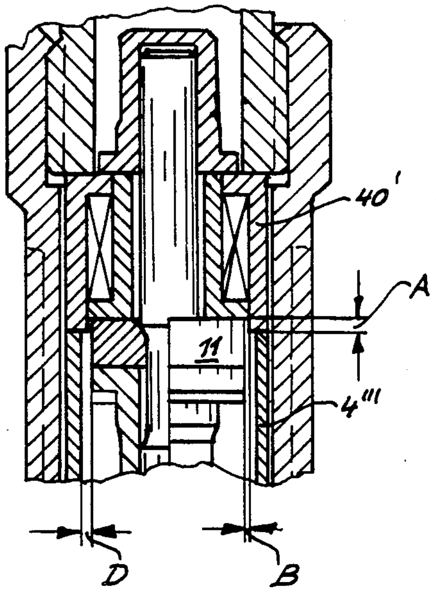

In the exemplary embodiment shown in FIG. 1 as well as in the variants of this embodiment shown in FIGS. 2, 3 and 4, outwardly opening fuel injection nozzles are shown in longitudinal section, wherein a nozzle body 1 is fastened via a sleeve nut 2 to a nozzle holder 3, with the interposition of a sheath-like tube segment 4. A valve needle 5 is guided in the nozzle body 1 in an axially displaceable manner and with a needle head 6 and a valve seat 7 disposed on the nozzle body 1 embodies the actual injection valve. The section is shown in several planes, to facilitate understanding of the design. For instance, in the upper half of the drawing the nozzle body 1 is shown uncut, while in the lower half it is shown in longitudinal section.

A closing spring 8 draws the valve needle 5 with its head 6 against the valve seat 7, the closing spring 8 being supported at one end on a shoulder 9 of the nozzle body and on the other end on a spring plate 10, which rests on a support ring 11 that is connected in a positively engaged manner with the valve needle 5. To this end, an annular groove 12 is provided on the valve needle, and the support ring 11 can be introduced into the annular groove 12 via a slot, so as to be centered with respect to the valve needle 5 by means of a conical bearing 13, thereby stressing the closing spring 8. A support ring of this kind may, however, be secured in some other manner on the valve needle instead, for instance by providing that the inside diameter of the bore of the support ring be somewhat larger than the outside diameter of the valve needle, so that after the support ring is inserted above the valve needle in the vicinity of the annular groove, two half sheaths are inserted into the annular space that results between the support ring bore and the annular groove.

The valve needle 5 protrudes with its end 14 remote from the needle head 6 into a cap 15 and with the cap forms a damping device including a damping chamber for the valve needle between the end 14 of the needle valve and the cap. The cap 15 is urged by a spring 16 in the opening direction of the needle 5 and in the outset position shown rests on a shoulder 32 on cap 15. The cap 15 and the spring 16 are disposed in a chamber 17, through which fuel that is delivered under pressure via a bore 18 flows.

This damping device operates as follows: As soon as the fuel delivered under pressure arrives at the injection nozzle, it flows via the bore 18 and the chamber 17 via slits 19 formed in cap 15 past the cap 15, along the valve needle 5 through a spacing gap B, between the support ring 11 and the sheath-like tube segment 4 to the chamber receiving the closing spring 8, and then on past this chamber and via radial bores 20 in the nozzle body 1 and an annular groove 21 in the valve needle via helical grooves 50 in the valve needle and annular groove 51 in the valve needle to the valve seat 7. As soon as a sufficient opening pressure due to incoming fuel is attained, the closing force of the spring 8 is overcome, and the needle head 6 is raised from the valve seat 7, whereupon injection begins. The other end of the valve needle 14, which slides in piston-like fashion in the cap 15, brakes this movement, because a negative pressure is generated in the chamber 22 located between the needle end 14 and the cap 15, and fuel can at first flow only gradually into the chamber 22, either via the play existing between the needle and the cap or via a separate throttle bore, not shown. At relatively low rpm, that is, relatively small injection quantities and hence a relatively short fuel delivery period such as during idling, the valve needle thus does not attain its full opening stroke. The injection duration is prolonged as a result, and the engine operates more quietly. As soon as the fuel delivery by the injection pump ceases, the valve needle is displaced back into the closing position shown by means of the closing spring 8. Since the closing spring 8 is much stronger than the spring 16 and the chamber 22 is also still more or less filled with fuel which can escape only gradually, the cap 15 is displaced counter to the force of the spring 16, causing a certain damping in the closing direction, wince this spring 16 acts counter to the spring 8.

In the area between the cap 15 and the support ring 11, an induction coil 23 is disposed about the valve needle 6. This coil 23 is sealed off with respect to the fuel by means of an encapsulation. This encapsulation comprises an outer sheath in the form of the tube segment 4, an inner sheath 24 having an annular chamber toward the valve needle 5, and two ring segments 25 and 26 connecting the sheaths 4 and 24 at either side of the coil 23 with one another. Of these ring segments 25 and 26, the ring 26 oriented toward the support ring 11 is of unmagnetized material. As a result of the unmagnetized ring 26, a magnetic short circuit is avoided. Examples of non-magnetized material that prevents magnetic flux from passing through it include not only certain noble steels but also plastic and ceramic materials. In every case, the magnetic circuit of the coil 23 proceeds via the support ring 11, because of this non-magnetized ring 26.

The support ring 11 has a definite gap with respect to the outer sheath 4, which even during the axial movement of the needle 5 remains unchanged. In the axial direction, the support ring 11 has a gap A for the magnetic circuit; this gap does vary in accordance with stroke, which results in a corresponding variation in the magnetic flux. Thus, the position of the support ring 11 at a given time, and hence the position of the valve needle 5, as well as their movements, can all be measured via the coil 23. To this end, the magnetic coil 23 is connected via a cable 27 with an electronic control unit, not shown.

In the basic realization of this first exemplary embodiment shown in FIG. 1, the rings 25, 26 are welded to the inner sheath 24, so that the ring 25 and the inner sheath 24 may also be made in one piece. This hub receiving the coil 23 is introduced into the end of the tube segment 4 remote from the injection end and welded to the tube segment 4 as well, so that if needed the tube segment 4, ring 25 and inner sheath 24 may all be in one piece. During installation into the valve, a pin 28 is used for positional fixation. The cable 27 extends in a groove 29 of the nozzle holder 3 and discharges outside a sealing face 30 between the nozzle holder and the end of the tube segment 4 into the encapsulation for the coil 23. Upon excitation of the magnetic coil, the magnetic flux is directed via the inner sheath 24, the ring 25, the tube segment 4 and the gap B into the support ring 11. From the support ring 11, the circuit is then closed by returning via the axial gap A back to the inner sheath 24. If this axial gap A is varied, the magnetic flux is varied, which in turn effects a corresponding variation of the induction voltage, which can then be evaluated as a measured variable in the electronic control unit.

The cap 15 is supported, with its end face 31 oriented toward the coil, on the capsule of the magnetic coil 23. A flange 32 of the cap 15 serves as a supporting surface for the spring 16, which on the side remote from the flange is supported on the end face of the chamber 17.

In the variant shown in FIG. 2, this flange 32 shown in FIG. 1 is not present; instead, the spring 16' is supported on the end of the cap 15' toward the end face. As a result, the diameter of the chamber 17' can be kept smaller, so that the cable 27 can now be placed in a bore 33 of the nozzle holder 3. Also, the sealing face toward the end face between the magnetic coil encapsulation and the nozzle holder is larger in area as a result. In order to enable sufficient travel on the part of the spring 16′, the chamber 17′ is correspondingly greater in length in this variant.

A further variant shown in FIG. 2 is that the coil encapsulation is embodied as a magnetizable ring 34 having a U-shaped cross section, and that this ring, after the insertion of the magnetic coil, is closed by the non-magnetized ring 26 and sealed off, for instance by welding. The tube segment 4′ is shortened by the width of the cap, and the outer jacket ring 35 of the capsule is fastened in place together with the tube segment 4′. The magnetic flux passes through the U portion of the encapsulation and then flows via the end segment 36 of the tube segment 4′ to the support ring 11, and from there back to the U-shaped portion. In the vicinity of the definite gap B between the tube segment 4′ and the support ring 11, the tube segment 4′ has a reinforcement 37, as a result of which field dissipation into the remainder of the tube is reduced. Disposed between the bottom part of the U-shaped encapsulation 34 and the nozzle holder 3 is an non-magnetized ring 38, which again reduces dissipation losses.

In a further variant, shown in FIG. 3, the inner sheath of the coil encapsulation is also of nonmagnetic material. It is combined in one part, as an angle ring 39, with the unmagnetized ring of the encapsulation that is oriented toward the support ring 11. The outer ring of the encapsulation is combined in one piece with the bottom ring, oriented toward the cap 15, of the encapsulation to make a second angle ring 40. The magnetic coil 23 is disposed between these two angle rings 39 and 40. The outer angle ring 40, which is of magnetizable material, protrudes beyond the flange of the inner angle ring 39 by the length A. The magnetic circuit thus passes via the outer angle ring 40, the cap 15, the valve needle 5 and the support ring 11, and from there via the gap B back to the outer angle ring 40. Depending upon the amount of overlap between the spacing distance A and the support ring 11 in the axial direction, the magnetic flux is throttled to a greater or lesser extent. For the sake of dividing the magnetic flux, an unmagnetized ring 41 is disposed between the outer ring 40 and the tube segment 4″. The magnetic flux can also, however, flow not via the bottom part of the outer ring 40 but instead via the gap C from the nozzle holder 3 out toward the cap 15. This happens when the cap 15 lifts up from its bearing surface, being displaced counter to the spring 16. An additional means is thereby provided for measuring this mechanical operation inside the nozzle.

In the variant shown in FIG. 4, the difference from the variant of FIG. 3 is that here the ring 41 is dispensed with. The outer ring 40′ is therefore kept substantially thicker than the tube segment 4″ in the vicinity of the overlap A between the outer ring and the support ring 11. As a result, the radial gap B, across which the magnetic flux travels, is substantially smaller between the outer sheath 40′ and the support ring than the radial gap D between the support ring 11 and the tube segment 4‴. By this provision as well, it can be attained that in every case, following the principle of least resistance, the magnetic flux will seek to travel via the gap B.

The different variants described in the individual drawing figures may be combined in different ways with one another in accordance with the invention, to the extent that this is structurally possible.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A fuel injection nozzle for internal combustion engines comprising a housing; a sheath-like tubular segment in said housing, a valve needle, a damping piston disposed on an end of said valve needle remote from an injection side of said valve needle, a support ring on said valve needle, a closing spring which stresses said support ring to force said valve needle in a closed direction, said valve needle opening in the flow direction of fuel under fuel inlet pressure, a cap disposed on said damping piston, said damping piston defining with said cap a damping chamber which communicates in a throttled manner with a flow path of fuel admitted through an inlet under pressure, a damping chamber formed by said damping piston and said cap, an encapsulated induction coil disposed about the valve needle and attached to said sheath-like tubular segment in a spatial segment between said damping chamber and said support ring for determining an injection onset and-or injection duration, and said support ring serves as an armature of a transducer embodied by said induction coil, and at least one yoke part of said encapsulated induction coil.

2. A fuel injection nozzle as defined by claim 1, in which said damping chamber is embodied in said cap which mounted on said damping piston, a spring which loads said cap in the direction of said damping piston, said cap being supported, in its outset position effected by said spring on a shoulder attached to said sheath-like tubular segment.

3. A fuel injection nozzle according to claim 2, in which an end face of the encapsulation of said induction coil is oriented toward said cap and serves as the shoulder attached to said sheath-like tubular segment.

4. A fuel injection nozzle as defined by claim 1, in which the encapsulation of the induction coil comprises an outer sheath, an inner sheath, and first and second ring segments sealingly connecting said sheaths with one another at either side of said induction coil, said first ring segment oriented toward said support ring made of non-magnetized material, said outer sheath is made of magnetizable material and has with respect to said support ring a definite, radial play B across which magnetic flux can travel, said first ring segment forms a bond with said tubular segment enclosing said closing spring, said tubular segment being fastenable in the longitudinal direction between a nozzle body having an injection opening and a nozzle holder by means of a sleeve nut.

5. A fuel injection nozzle as defined by claim 2, in which the encapsulation of the induction coil comprises an outer sheath, an inner sheath, and first and second ring segments sealingly connecting said sheaths with one another at either side of said induction coil, said first ring segment oriented toward the support ring made of nonmagnetized material, said outer sheath is made of magnetizable material and has with respect to said support ring a definite, radial play B across which magnetic flux can travel, said first ring segment forms a bond with said tubular segment enclosing said closing spring, said tubular segment being fastenable in the longitudinal direction between a nozzle body having an injection opening and a nozzle holder by means of a sleeve nut.

6. A fuel injection nozzle as defined by claim 3, in which the encapsulation of the induction coil comprises an outer sheath, an inner sheath, and first and second ring segments connecting said sheaths with one another at either side of said induction coil, said first ring segment oriented toward the support ring made of non-magnetized material, said outer sheath is made of magnetizable material and has with respect to said support ring a definite, radial play B across which magnetic flux can travel, said first ring segment forms a bond with said tubular segment enclosing said closing spring, said tubular segment being fastenable in the longitudinal direction between a nozzle body having an injection opening and a nozzle holder by means of a sleeve nut.

7. A fuel injection nozzle as defined by claim 4, in which at least a portion of said tubular segment acts as said outer sheath, and that said inner sheath and said second ring segment, beginning with the end of said tubular segment oriented toward said cap is secured to an end of said tubular segment.

8. A fuel injection nozzle as defined by claim 5, in which at least a portion of said tubular segment acts as said outer sheath, and that said inner sheath and said second ring segment, beginning with the end of the tube segment oriented toward said cap is secured to an end of said tubular segment.

9. A fuel injection nozzle as defined by claim 6, in which at least a portion of said tubular segment acts as said outer sheath, and that said inner sheath and said second ring segment, beginning with an end of said tubular segment oriented toward said cap is secured to an end of said tubular segment.

10. A fuel injection nozzle as defined by claim 4, in which the encapsulation of the induction coil comprises a ring having a U-shaped cross section for receiving the coil, the ring being sealingly closed by a non-magnetized ring segment, and that an outer sheath of the U-shaped part is axially fastened in place between the nozzle holder and said tubular segment.

11. A fuel injection nozzle as defined by claim 5, in which the encapsulation of the induction coil comprises a ring having a U-shaped cross section for receiving the coil, the ring being sealingly closed by a non-magnetized ring segment, and that an outer sheath of the U-shaped part is axially fastened in place between the nozzle holder and the tube segment.

12. A fuel injection nozzle as defined by claim 6, in which the encapsulation of the induction coil comprises a ring having a U-shaped cross section for receiving the coil, the ring being sealingly closed by a non-magnetized ring segment, and that an outer sheath of the U-shaped part is axially fastened in place between the nozzle holder and the tube segment.

13. A fuel injection as defined by claim 4, in which the magnetic coil encapsulation comprises inner and outer rings of angular cross section receiving said induction coil between them, of which said inner ring is of non-magnetized material, and said outer ring on the side oriented toward said support ring protrudes beyond said inner ring for the magnetic flux by a predetermined distance (A).

14. A fuel injection as defined by claim 5, in which the magnetic coil encapsulation comprises inner and outer rings of angular cross section receiving said induction coil between them, of which said inner ring is of non-magnetized material, and said outer ring on the side oriented toward said support ring protrudes beyond said inner ring for the magnetic flux by a predetermined distance (A).

15. A fuel injecttion as defined by claim 6, in which the magnetic coil encapsulation comprises inner and outer rings of angular cross section receiving said induction coil between them, of which said inner ring is of non-magnetized material, and said outer ring on the side oriented toward said support ring protrudes beyond said inner ring for the magnetic flux by a predetermined distance (A).

16. A fuel injection nozzle as defined by claim 13, in which a ring of non-magnetized material is disposed between said outer ring and said tubular segment.

17. A fuel injection nozzle as defined by claim 14, in which a ring of non-magnetized material is disposed between said outer ring and said tubular segment.

18. A fuel injection nozzle as defined by claim 15, in which a ring of non-magnetized material is disposed between said outer ring and said tubular segment.

19. A fuel injection nozzle as defined by claim 13, in which said outer ring is fastened in place between the nozzle holder and said tubular segment, and the radial distance (B) between the outer ring and the support ring is smaller than the radial distance (D) between said tubular segment and the support ring.

20. A fuel injection system as defined by claim 2, in which a disk of non-magnetized material is disposed between the encapsulation and the nozzle holder.

* * * * *